Oct. 6, 1964   J. G. R. PARÉ ETAL   3,151,504
METHOD OF MAKING A PUNCH AND DIE ASSEMBLY
Filed Oct. 29, 1963   2 Sheets-Sheet 1

INVENTORS
JOSEPH G. R. PARÉ &
JOSEPH G. F. HOTTE
BY- *Smart & Biggar*
ATTORNEYS.

Oct. 6, 1964    J. G. R. PARÉ ETAL    3,151,504
METHOD OF MAKING A PUNCH AND DIE ASSEMBLY
Filed Oct. 29, 1963    2 Sheets-Sheet 2
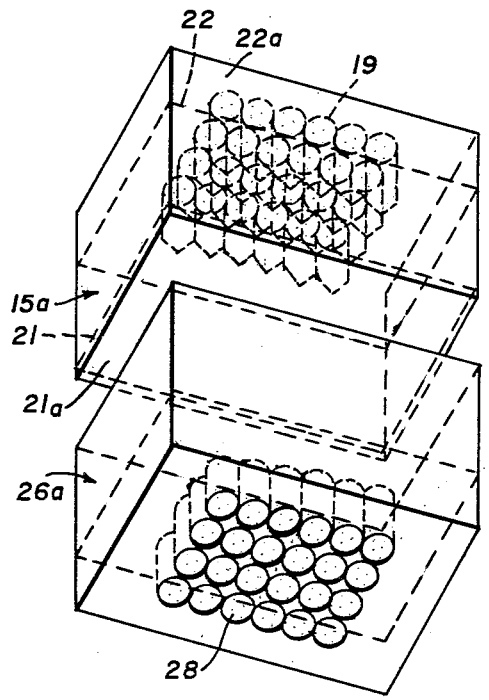
FIG. 3
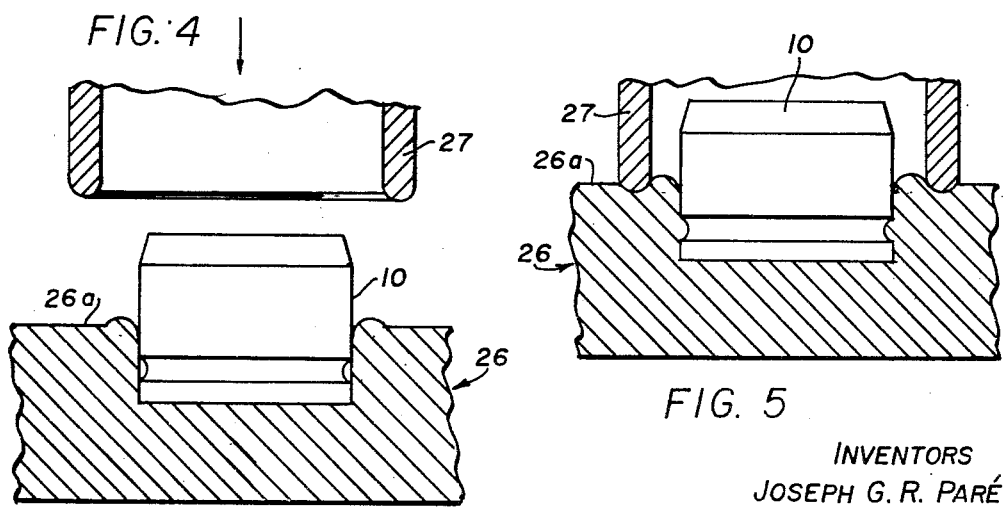
FIG. 4
FIG. 5
INVENTORS
JOSEPH G. R. PARÉ &
JOSEPH G. F. HOTTE.
BY— *Smart & Biggar*
ATTORNEYS.

United States Patent Office 3,151,504
Patented Oct. 6, 1964

3,151,504
METHOD OF MAKING A PUNCH AND DIE ASSEMBLY
Joseph G. R. Paré, Candiac, Quebec, and Joseph G. F. Hotte, Lasalle, Quebec, Canada, assignors to Northern Electric Company Limited, Montreal, Quebec, Canada
Filed Oct. 29, 1963, Ser. No. 319,888
7 Claims. (Cl. 76—107)

This invention relates to a method of making a punch and die assembly to be used for blanking material, in the manufacture of stampings.

In the past, various methods of making punch and die assemblies for the manufacture of stampings, have been employed. One of the most common methods is to separately machine both a punch and a die from blocks of high grade tool steel. The punch and the die are then aligned and mounted in exact registration on a die set, after which they are removed for hardening and grinding. Because precision tolerances are required in forming the punch and the die, this method is both expensive and time consuming.

An improved method is to machine one of the pieces, for example, the die to the exact shape required, from high grade steel. The punch is then roughly formed from a block of softer metal to slightly larger dimensions than the contour opening of the die. The two pieces are then mounted in registration on the die set after which the die is removed for hardening and grinding. After remounting the die on the die set, the punch is pressed into the die, whereby the excess material is removed from the punch. This operation is known as shearing the punch and provides it with an exact contour of the die. A small amount of material is then removed from the sides of the punch to provide the desired clearance between the punch and the die. The punch is then hardened. After reassembling it in the die set the assembly is ready for the production of stampings.

The inverse method is, of course, also employed, in which the punch is first shaped to the exact contour of the desired stamping, and is then used to shear the die.

Although the two latter methods result in a substantial saving in time and money over the former method, considerable time and expense are still involved in cutting a rough contour in one of the pieces, in shearing one piece into the other, and in grinding the desired clearance between the two pieces.

These disadvantages have been overcome in the present invention by forming the punch from the customary high grade steel to the outline of the desired stamping. After hardening the punch, its stamping face is impressed into a die blank made of hobbing steel, which has the quality of flowing under high pressure, to a depth sufficient to receive the stamping. After this hobbing operation, the punch and the die are separated and the die block is case-hardened. To facilitate the flow of material during the hobbing operation, the cutting edge of the punch is rounded. After hobbing, this rounded edge is removed by grinding a layer of material from the stamping face of the punch. The necessary clearance between the punch and the die is obtained by slightly tapering the sides of the punch adjacent its cutting edge. This tapering operation may be performed either before or after hobbing the die. If the tapering operation is performed before the hobbing operation, the punch is hobbed to a sufficient depth so that the cutting edge of the die is produced by the sides of the punch behind the tapered portion. The amount of clearance between the punch and die is controlled by varying the degree of taper and/or the amount of material removed from the stamping face of the punch after the hobbing operation.

To facilitate its manufacture, the punch is made without a mounting flange. A shallow annular groove is cut in the sides of the punch towards the end remote from the stamping face. After forming the die, the punch is hobbed into a punch plate made of hobbing steel to a sufficient depth to encompass the groove. The punch is retained in the plate by the application of external pressure which binds the two together. The plate forms a mounting flange for the punch.

A preferred embodiment of the invention will now be described with reference to the accompanying drawings in which:

FIGURE 3 is a perspective view of a die blank and a flange blank;

FIGURES 4 and 5 are cross-sectional views of the apparatus used for mounting the punch illustrated in FIGURES 1 and 2.

Figures 1, 2:
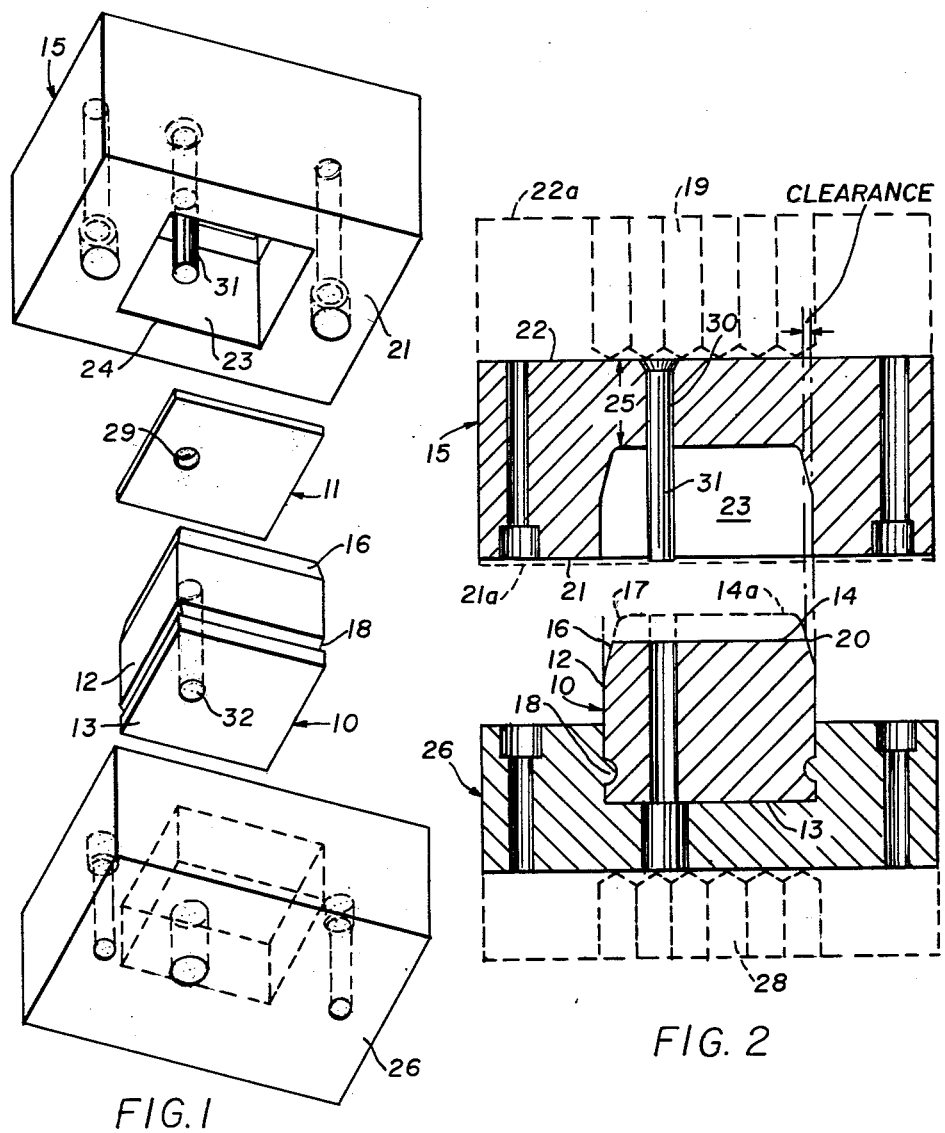
FIGURE 1 is an exploded view of a punch and die assembly and a stamping.
FIGURE 2 is a detailed cross-section of the punch and die assembly.

Referring now to the drawings, a punch 10 is formed from high grade tool steel, to the shape of a desired stamping 11 by any one of the well known methods. The punch 10 has sides 12, a rear surface 13, and at its cutting end, a flat stamping face 14a perpendicular to the sides 12. To obtain the desired clearance between the punch 10 and a die 15 to be formed by the punch 10, the sides 12 of the punch 10 are slightly tapered as shown at 16, adjacent the stamping face 14a of the punch 10. The edges 17 between the tapered sides 16 and the stamping face 14a are rounded. An annular groove 18 is machined in the sides 12 of the punch 10 near the rear surface 13.

The punch 10 can be completely machined in the soft state and then hardened; or for more accuracy it can be merely roughly machined while in the soft state, and thereafter hardened and ground to the shape of the desired stamping 11.

The die 15 is formed from a die blank 15a made of hobbing steel, which has the quality of flowing under high pressure. Relief holes 19 are drilled in the die blank 15a to provide room for the material displaced by the punch 10 during the hobbing operation. The hardened punch 10 is then pressed into the die blank 15a thereby forming the die 15.

The rounded edges 17 facilitate the flow of material during the hobbing operation. After forming the die 15 the punch 10 is separated from it, and a layer of material is ground from the stamping face 14a of the punch 10, thereby removing the rounded edges 17 and forming a finished stamping face 14 which now meets the tapered sides 16 of the punch 10 along a sharp cutting edge 20.

The die 15 comprises a stamping face 21a, a bottom surface 22a, a die opening 23 in the stamping face 21a, and a cutting edge 24 encompassing the periphery of the die opening 23. The punch 10 is pressed a sufficient depth into the die blank 15a so that the impression left by the perpendicular sides 12 of the punch 10 in the die opening 23 is deeper than the thickness of the material of the stamping 11. After the hobbing operation, the face 21a and the surface 22a of the die 15 are machined to remove all raised surfaces and displaced material thereby forming the finished stamping face 21 and the finished bottom surface 22. The die opening 23 is now the exact shape of the desired stamping 11. The thickness of the material of the die blank 15a is chosen so that after the machining operation, a reinforcing web 25 is left at the base of the die opening 23.

In forming the punch 10 and the die 15, a certain amount of clearance must be left between the cutting edge 20 of the punch 10 and the cutting edge 24 of the die 15. This clearance depends upon the type and thickness of raw material used for the stamping 11. Since the die opening 23 was produced by the perpendicular sides 12 of the punch 10, the necessary clearance can be obtained by varying the degree of taper of the sides 16 and the amount of material removed from the stamping face 14a of the punch 10 by machining after forming the die 15.

In applications where long life is demanded of the die 15, the punch 10 is not initially tapered but is still rounded as at 17. The desired clearance is ground from the sides of the punch 10 after forming the die 15.

After being formed by the punch 10, the whole die 15 is case hardened to a depth of .050 inch and a hardness of RC 58-60. This affords a good wear resisting surface at the cutting edge 24 of the die opening 23, supported by a tough core.

The punch 10 is made without a flange to facilitate its manufacture. After forming the die 15, the rear surface 13 of the punch 10 is driven under hydraulic pressure into a blank 26a. A hobbing ring 27 is placed around the punch 10 in contact with the blank 26a. Pressure is then applied between the ring 27 and the blank 26a. This compresses the material of the blank 26a around the sides of the punch 10 and into its annular groove 18 and provdes a binding fit between the two parts which is sufficient to resist any stripping pressure that would normally tend to pull the punch 10 and the blank 26a apart during the manufacture of the stamping 11. The blank 26a thus forms a punch plate 26. Prior to this pressing operation, relief holes 28 similar to the relief holes 19, are drilled in the blank 26a. After the pressing operation, the material forced into the relief holes 28 is removed by machining the plate 26.

If it is desired to have a pierced hole 29 in the stamping 11, a mounting hole 30 for a piercing punch 31 is drilled in the die 15 after hobbing the die 15 but before case-hardening it. After the die 15 is case-hardened, the piercing punch 31 is mounted in the hole 30. A corresponding piercing hole 32 is drilled in the punch 10 while the punch is in its soft state. After hardening the punch 10, the piercing hole 32 is temporarily plugged with a steel rod (not shown), to prevent the flow of material into the hole 32 during the hobbing operation. Since the hole 32 has been predrilled in the punch 10, it may be used as a guide for drilling the mounting hole 30 by placing the punch 10 in the die 15 and inserting the drill (not shown) through the hole 32.

After manufacture of the die 15 and punch 10 has been completed, the punch plate 26 containing the punch 10 is secured to a base plate (not shown) by bolts or other conventional means. The die is then mounted in exact registration with the punch 10 on a top plate (not shown) also by conventional means. This may be facilitated by inserting the mounted punch 10 in the die 15 in order to obtain perfect alignment between the two parts immediately prior to mounting the die 15.

What we claim as our invention is:

1. A method of making a punch and die assembly for the production of stampings which comprises the following steps: shaping the punch to the outline of the desired stamping, the punch having a flat stamping face, a rear surface and sides perpendicular to said stamping face; tapering the sides of the punch adjacent said stamping face, rounding the edges of the stamping face; hardening the punch; pressing the stamping face of the punch into a die block beyond the depth of the tapered sides of the punch, thereby forming the die with a cavity having an opening formed by the perpendicular sides of the punch; the die block material displaced during said pressing operation being forced into relief holes predrilled in said die block; said die having a stamping face containing the die opening, and a rear surface; removing the punch from the die; machining the stamping face of the punch to remove said rounded edges and to form cutting edges around said stamping face, machining the stamping face and the rear surface of the die to remove the displaced material; case hardening the die.

2. A method as defined in claim 1 in which clearance between the tapered sides of the punch and the die opening provides the desired working clearance.

3. A method as defined in claim 2 which further comprises securing the punch to a base plate and the die in registration with the punch to a top plate.

4. A method as defined in claim 3 in which the method of securing the punch to the base plate comprises cutting an annular groove in the sides of the punch near the rear surface, pressing the rear surface of the punch into a punch plate, made of hobbing steel, to a depth sufficient to encompass said groove, placing a hobbing ring over the punch in contact with said plate, applying pressure between said ring and said plate so that the material of said plate is compressed around the sides of said punch and into said annular groove, said plate thereby forming a mounting flange, securing said mounting flange to the base plate.

5. A method as defined in claim 2 in which the step of tapering the sides of the punch adjacent the stamping face is performed subsequent to forming the die.

6. A method as defined in claim 5 which further comprises securing the punch to a base plate and the die in registration with the punch to a top plate.

7. A method as defined in claim 6 in which the method of securing the punch to the base plate comprises cutting an annular groove in the sides of the punch near the rear surface, pressing the rear surface of the punch into a punch plate, made of hobbing steel, to a depth sufficient to encompass said groove, placing a hobbing ring over the punch in contact with said plate, applying pressure between said ring and said plate so that the material of said plate is compressed around the sides of said punch and into said annular groove, said plate thereby forming a mounting flange, securing said mounting flange to the base plate.

References Cited in the file of this patent
UNITED STATES PATENTS 2,325,989    Tryon _____ Aug. 3, 1943
2,432,819    Schumacker _____ Dec. 19, 1947